(12) United States Patent
Mosiewicz et al.

(10) Patent No.: US 6,715,989 B2
(45) Date of Patent: Apr. 6, 2004

(54) AXIAL FAN

(75) Inventors: Roberto Eduardo Mosiewicz, Stresa (IT); Ryszard Piekarsky, Tomaszow Maz (PL)

(73) Assignee: Diandra S.A., rue Beaumont (LU)

( * ) Notice: Subject to any disclaimer, the term of this patent is extended or adjusted under 35 U.S.C. 154(b) by 0 days.

(21) Appl. No.: 09/972,665

(22) Filed: Oct. 5, 2001

(65) Prior Publication Data
US 2003/0002984 A1 Jan. 2, 2003

(30) Foreign Application Priority Data

Oct. 5, 2000 (IT) .................................... MI2000A2156
Oct. 12, 2000 (LU) .................................. 90652

(51) Int. Cl.$^7$ ............................................. F04D 29/34
(52) U.S. Cl. ............................ 416/134 R; 416/210 R; 403/337
(58) Field of Search ......................... 416/210 R, 211, 416/220 A, 204 R, 5, 205, 207, 214 R, 244 R; 403/337, 278, 408.1

(56) References Cited

U.S. PATENT DOCUMENTS

| | | | |
|---|---|---|---|
| 2,990,018 A | * 11/1959 | Moore | |
| 3,765,267 A | * 10/1973 | Bourquardez et al. | 74/581 |
| 3,825,369 A | * 7/1974 | Albertzart | 416/229 |
| 3,910,718 A | * 10/1975 | MacEwen et al. | 416/132 |
| 4,095,919 A | 6/1978 | Ehrenskjold et al. | 416/142 |
| 4,640,668 A | 2/1987 | Yang | 417/354 |
| 4,678,923 A | * 7/1987 | Trepanier | 290/55 |
| 4,776,761 A | 10/1988 | Diaz | 416/5 |
| 5,240,377 A | * 8/1993 | Farr | 416/229 R |
| 6,022,191 A | * 2/2000 | Moore et al. | 416/134 R |
| 6,431,837 B1 | * 8/2002 | Velick | 416/223 R |

FOREIGN PATENT DOCUMENTS

FR   1 391 367 A   6/1965

* cited by examiner

*Primary Examiner*—Edward K. Look
*Assistant Examiner*—J. M. McAleenan
(74) *Attorney, Agent, or Firm*—Morgan & Finnegan, LLP

(57) ABSTRACT

The present invention relates to an axial fan of the type comprising a hub, a plurality of arms extending radially outwardly from the hub and blade members, each blade member being secured to its respective arm, wherein the arms consist of flexible elements with a bending stiffness such that, in operation, the blade members are inclined at an angle at which the centrifugal forces acting on the blade members neutralize the traction forces acting on same.

The load variations and ensuing vibrations are thus substantially reduced, thereby increasing the service life of the fan blades and the drive mechanism.

12 Claims, 4 Drawing Sheets

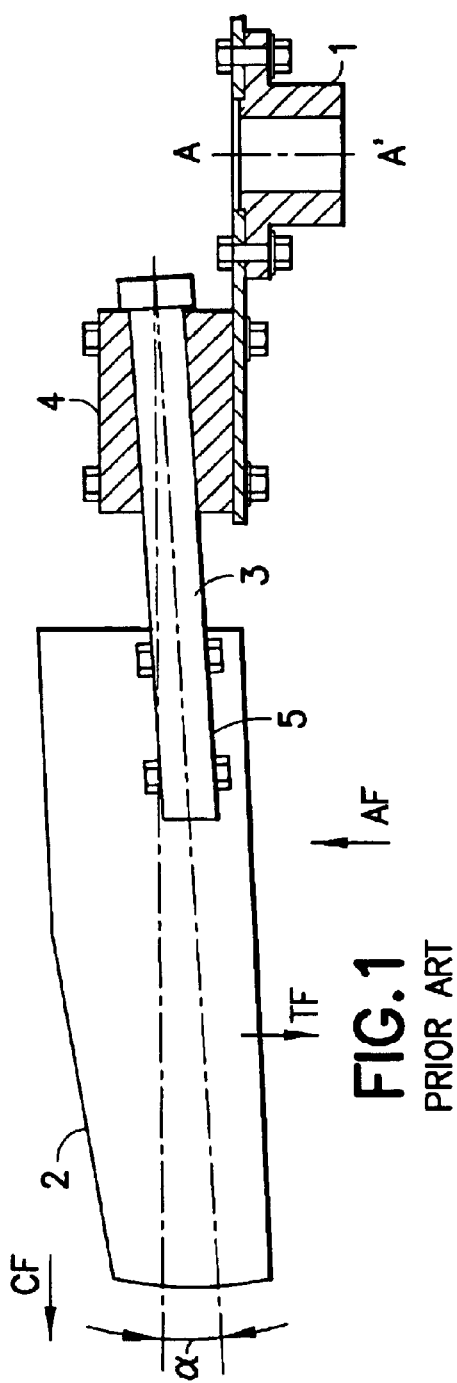
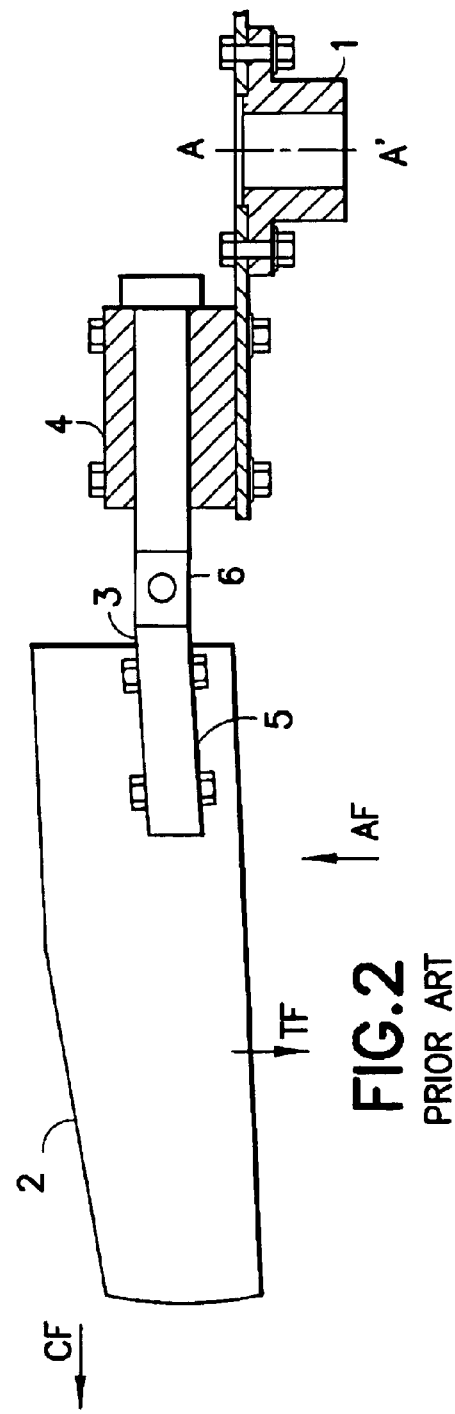
FIG.1 PRIOR ART
FIG.2 PRIOR ART

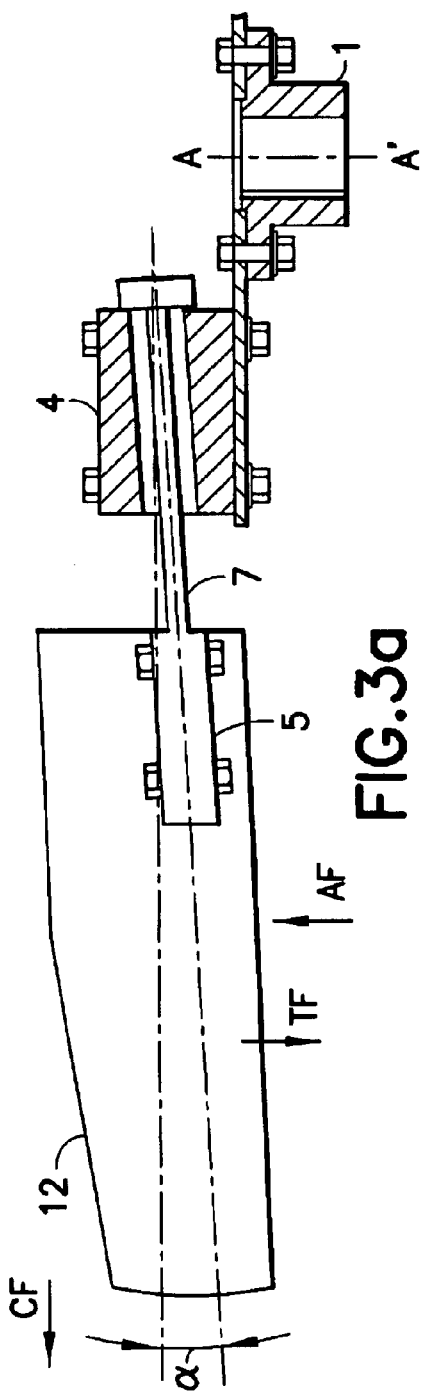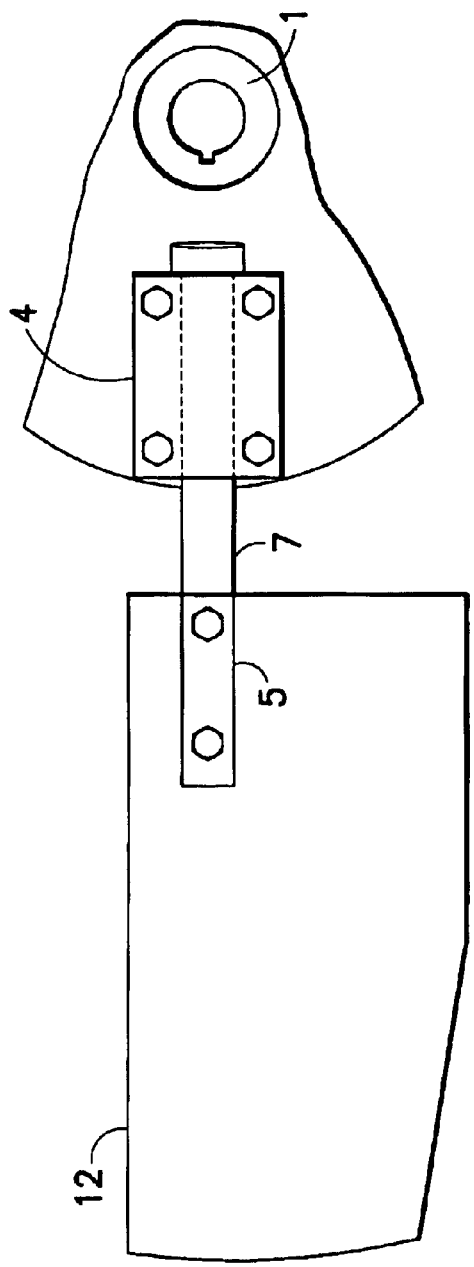
FIG.3a
FIG.3b

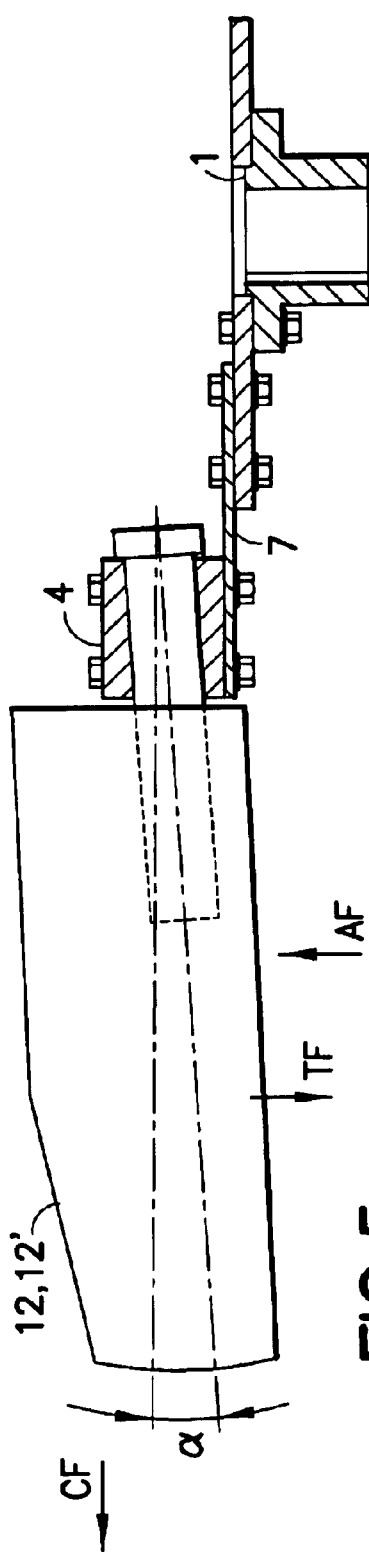
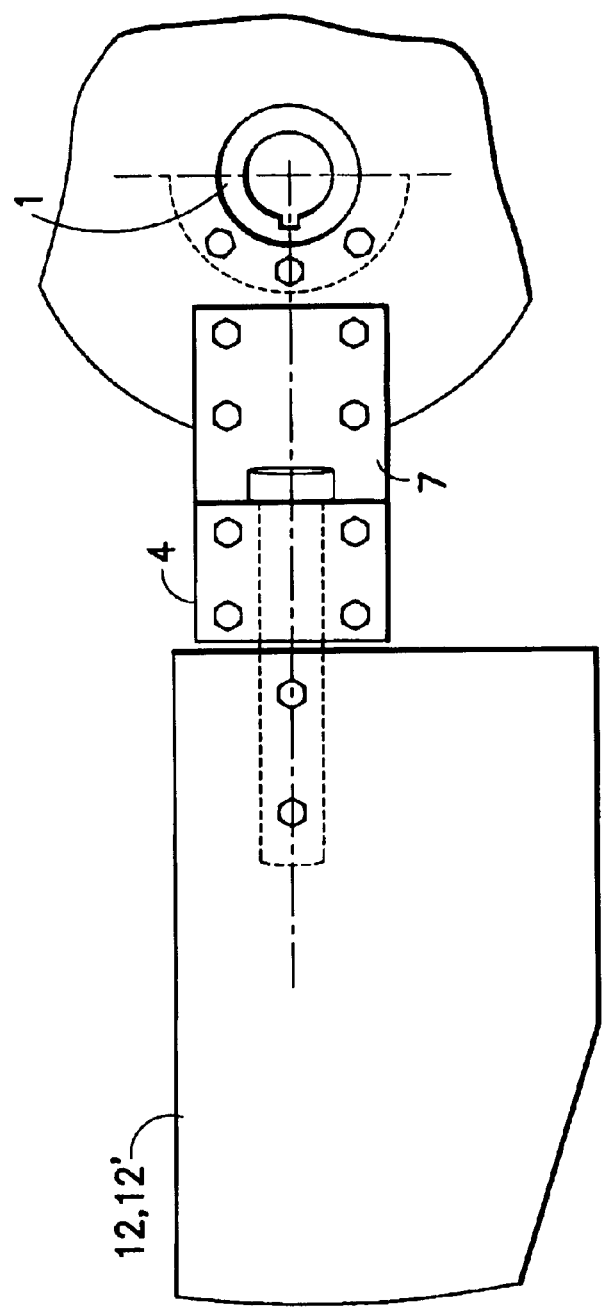
FIG.5a
FIG.5b

AXIAL FAN

BACKGROUND OF THE INVENTION

The present invention relates to the field of axial fans, and more particularly to an improved means for mounting fan blades on a rotatable hub.

Axial fans are widely used to transform mechanical energy, which has been supplied to them by a motor, into displacement of air. They are used wherever it is necessary to evacuate or to feed air or any other gas.

The present invention relates to an axial fan of the type comprising a hub, a plurality of arms extending radially outwardly from the hub and blade members, each blade member being secured to its respective arm.

PRIOR ART

Axial fans are generally subjected to substantial loads which act primarily on the inner ends, i.e. the roots of the blades. The loads which act on the blades are composed mainly of the traction force, acting to push the blades in the axial direction opposite to the air flow, and the ensuing component of the centrifugal force acting to push the blades back into the direction of the air flow. Consequently, some of these loads and their variations are transmitted in the form of vibrations from the blades to their roots and to the power transmission group (hub and drive), resulting in substantial wear of the fan structure. The connection between the inner ends of the blades and the hub, therefore, is critical since it is a possible source of failure due to fatigue cracking.

Currently, a reduction of the loads acting on the blades is obtained, for example, by a method which consists of mounting the blades with a fixed inclination with respect to the plane of rotation in a direction opposite to the air flow. Such an assembly can be seen in FIG. 1, showing a blade 2 connected to a hub 1 by means of an arm 3. The arm 3 is secured to the hub 1 by a clamping device 4 and to the blade 2 by a securing device 5. The blade is inclined at an angle $\alpha$ with respect to the plane of rotation, which is the plane perpendicular to the axis of rotation AA'. The main forces acting on the blade 2 are the centrifugal force CF and the traction force TF; the direction of air flow is indicated by the arrow AF.

As a result of the fixed inclination of the blades, loads can only be neutralised if the fan operates precisely in the conditions predicted by the original calculation, i.e. at a predetermined and constant speed of rotation.

Another prior art method proposes to connect the hub to the roots of the blades by a hinge, thereby enabling the blades to float when the fan is in operation. Such an assembly can be seen in FIG. 2 where, similarly to FIG. 1, there is shown a blade 2 connected to a hub 1 by means of an arm 3'. The arm 3' is secured to the hub 1 by a clamping device 4 and to the blade 2 by a securing device 5. The main forces acting on the blade 2 are the centrifugal force CF and the traction force TF; the direction of air flow is indicated by the arrow AF. Numeral 6 designates a hinge providing a non-rigid connection between the blade 2 and the hub 1. Since both parts of the hinge are movable with respect to each other, both parts are exposed to wear and need frequent maintenance. Furthermore, the gap between the two parts of the hinge provides a space for the penetration of corrosive elements or the formation of deposits that ultimately could impede the relative movement of both parts of the hinge, preventing them from fulfilling their function of neutralising traction and centrifugal forces acting on the blades.

SUMMARY OF THE INVENTION

The object of the present invention is to provide an axial fan with a simple structure, wherein the load variations and the ensuing vibrations are substantially reduced.

In accordance with the present invention, this object is achieved by providing an axial fan of the type comprising a hub, a plurality of arms extending radially outwardly from the hub and blade members, each blade member being secured to its respective arm, characterised in that the arms consist of flexible elements with a bending stiffness such that, in operation, the blade members are inclined at an angle at which the centrifugal forces acting on the blade members neutralise the traction forces acting on same.

In an axial fan according to the present invention, the flexible elements are sized according to the operational requirements of the fan in such a way that, when the fan is in use, the blades adjust to a position where the bending moment generated by the traction forces TF is neutralised by the opposite bending moment generated by the centrifugal forces CF. Consequently, the loads acting on the roots of the blades tend to cancel each other out and, at the same time, the load variations and ensuing vibrations transmitted from the blades to the power transmission group are substantially reduced, thereby increasing the service life of the fan blades and the drive mechanism. The fan of the present invention has a higher resistance to fatigue than the fan of the prior art.

A reduction in the vibrations of the blades, as obtained by the present invention, allows the design of fan blades using less valuable materials, thinner materials, or a combination of both, which constitutes a further advantage of the invention.

DESCRIPTION OF THE DRAWINGS

The invention will now be described by way of example and with reference to the accompanying drawings, where:

FIG. 1 shows a side view of a first example of an axial fan according to the prior art;

FIG. 2 shows a side view of a second example of an axial fan according to the prior art;

FIG. 3a shows a side view and FIG. 3b a top view of an axial fan according to a first embodiment of the invention, wherein the flexible element is secured to the root of the blade;

FIG. 5a shows a side view and FIG. 5b a top view of an axial fan according to a third embodiment of the invention, wherein the flexible element is secured to the blade.

DESCRIPTION OF THE PREFERRED EMBODIMENTS

Figure 4A:
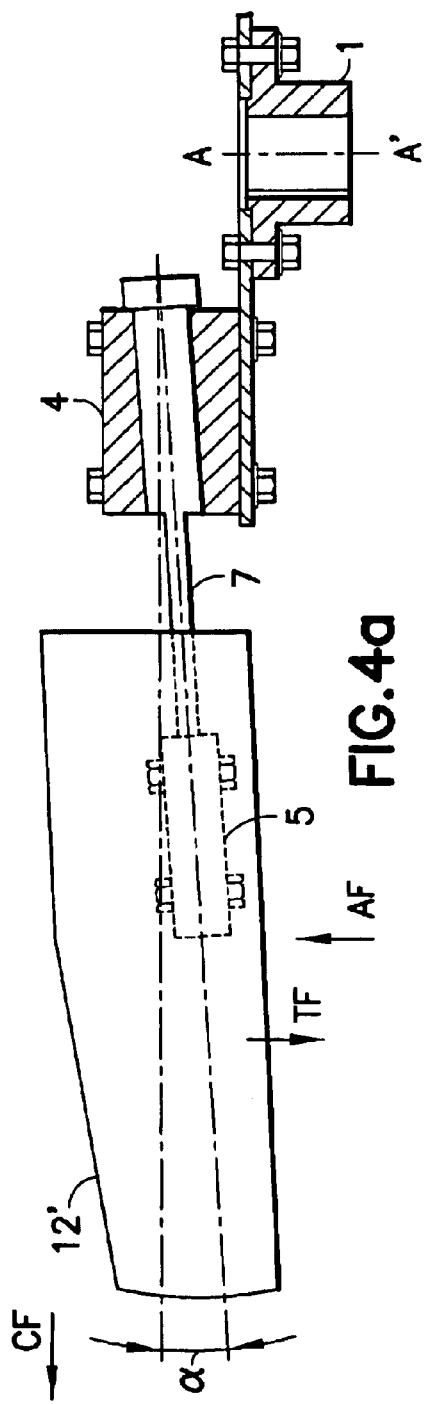
FIG. 4a shows a side view and FIG. 4b a top view of an axial fan according to a second embodiment of the invention, wherein the blade member is a hollow blade and the flexible element is secured on the inside of the hollow blade.

FIGS. 3 (3a, 3b) shows a first embodiment of the invention, where the axial fan comprises a plurality of blade members 12 connected to the hub 1 by means of flexible elements 7. Each flexible element 7 is secured to the hub 1 by a clamping device 4 (not further described herein since it is already known) and to the blade member 12 by a securing device 5 (not further described herein since it is already known). As explained above in connection with the prior art fans, it is of advantage that the blade member 12 is mounted at an angle $\alpha$ with respect to the plane of rotation, which is the plane perpendicular to the axis of rotation AA'. The main forces acting on the blade member 12 are the centrifugal force CF and the traction force TF; the direction of air flow is indicated by the arrow AF.

A flexible element 7 preferably has an aerodynamic cross-section, for example a circular cross-section, but it may however be designed as a number of different shapes, as long as it fulfils its function of bending in order to compensate the opposing loads on the blade member 12.

The materials used in the manufacture of a flexible elements 7 may, for example, consist of fibre-reinforced resins, which are known to have an elastic modulus allowing them to bend substantially, even when submitted to small loads.

Other materials such as laminated structures can be used for a flexible elements 7. These laminated structures can be provided at both extremities with end portions matching corresponding portions on the blade members 12 and on the hub 1. Preferably these end portions are formed as integral parts of the laminated structure. Alternatively, the blade members 12 consist of a laminated structure whereby the flexible elements 7 form an integral part of the blade members 7.

Figure 4B:
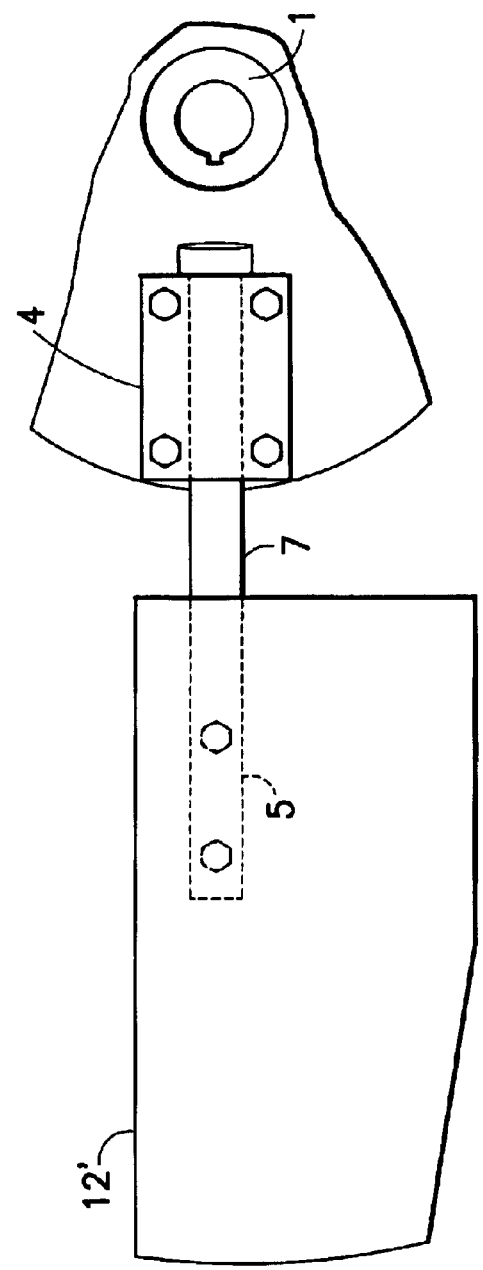

In a second embodiment of the invention, shown in FIG. 4, an axial fan comprises a plurality of blade members 12' of an airfoil type connected to the hub 1 by means of flexible elements 7. Airfoil type blade members typically consist of sheets bent into an airfoil shape forming an aerodynamic profile with a hollow structure.

This allows the flexible element 7 to be secured to the blade member 12' on the inside thereof within the hollow structure, as can be seen in FIG. 4, where the flexible element 7 is secured to the blade member 12' by a securing device 5 and to the hub 1 by a clamping device 4. As explained above in connection with the prior art fans, it is of advantage that the blade member 12' is mounted at an angle α with respect to the plane of rotation, which is the plane perpendicular to the axis of rotation AA'. The main forces acting on the blade member are the centrifugal force CF and the traction force TF; the direction of air flow is indicated by the arrow AF.

If it is not necessary to have blade members (12, 12') mounted at a variable angle a with respect to the plane of rotation, a laminar flexible element 7 may be used, fixed directly onto the hub 1.

If it is desired to increase the angle of inclination a of a blade member 12' of an airfoil type with low loads, the flexible element 7 is extended inside the blade member 12' and is then fixed further outside: when the fan is running, to avoid interference between the blade member 12' (which is more rigid) and the flexible element 7, the two parts are sized in such a way that the necessary space is left between them.

On the embodiments shown by way of example by FIGS. 3 and 4, one extremity of the flexible element 7 is supported by the clamping device 4 which is rigidly fixed to the hub 1 of the fan, while the other extremity of the flexible element 7 is fixed to the body of the blade members (12, 12'): said embodiments are not suitable for being advantageously used if it is necessary to have blade members (12, 12') mounted at a variable angle a with respect to the plane of rotation of the fan.

In fact, for the correct working of the flexible element 7 (composed normally of a laminar shaped body) it is necessary that the flexible element 7 be stimulated to perform (almost) exclusively a bend at a right angle to the plane of rotation of the fan, that is that the larger side of the flexible element 7 should lie (as far as possible) in the plane of rotation of the fan.

When (in the embodiments in FIGS. 3 and 4) the angle α with respect to the plane of rotation at which the blade members (12, 12') are mounted is varied, the flexible element 7 integral with the blade member (12, 12') is also turned, the larger side of the flexible element 7 no longer lies in the plane of rotation of the fan and is therefore stressed by the air flow AF: this leads to an increase in the bending stiffness of the flexible element 7 which (even if and when it does not "load" the flexible element 7 to breakage) does not allow the flexible element 7 to "work" as desired.

FIGS. 5 (5*a*, 5*b*) shows a further embodiment of the invention, suitable for being advantageously used for blade members (12, 12') mounted at a variable angle α with respect to the plane of rotation of the fan, which differs from the ones illustrated in FIGS. 3 and 4 essentially due to the fact that one extremity of the flexible element 7 is rigidly fixed to the hub 1 of the fan while the other extremity of the flexible element 7 is fixed to a clamping device 4 which supports the root area of the blade members (12, 12'): the larger side of the flexible element 7 always lies in the plane of rotation of the fan (the flexible element 7 therefore "works" or can "work" always in an optimum manner), while (acting on the clamping device 4) the angle α with respect to the plane of rotation at which the blade members (12, 12') are mounted may be modified as requires by the specific application without this involving a rotation of the flexible element 7, which is no longer integral with the blade members (12, 12').

When the fan is stationary, the weight of the blade members (12, 12') and the bending stiffness of the flexible elements 7 may be such that the blade members (12, 12') incline excessively or to an extent that they interfere with other elements of the fan.

In such cases a supporting element (not shown) which is fixed to the hub can be provided in order to support the blade members.

This supporting element can be for example a simple disc.

What is claimed is:

1. Axial fan comprising a hub, a plurality of arms extending radially outwardly from the hub and blade members, each blade member being secured to its respective arm, wherein each of the arms includes flexible elements with a bending stiffness in the axial direction of the air flow wherein, in operation, the blade members are inclined in the axial direction of the air flow at an angle at which the centrifugal forces acting on the blade members neutralize the traction forces acting on same in a direction parallel to the rotation axis.

2. Axial fan according to claim 1, wherein the blade members consist of sheets bent into an airfoil shape forming an aerodynamic profile with a hollow structure.

3. Axial fan according to claim 2, wherein the flexible elements are secured to the blade members on the inside thereof within the hollow structure.

4. Axial fan according to claim 1, wherein the flexible elements have a circular cross-section.

5. Axial fan according to claim 1, wherein the flexible elements are made of fiber-reinforced resins.

6. Axial fan according to claim 1, wherein the flexible elements consist of a laminated structure.

7. Axial fan according to claim 6, wherein the laminated structure comprises, at both extremities, end portions matching corresponding portions on the blade members and on the hub.

8. Axial fan according to claim 7, wherein the end portions are formed as integral parts of the laminated structure.

9. Axial fan according to claim 6, wherein the blade members consist of a laminated structure whereby the flexible elements form an integral part of the laminated structure of the blade members.

10. Axial fan according to claim 1, wherein one extremity of the flexible element is supported by a clamping device rigidly fixed to the hub of the fan, the other extremity of the flexible element being fixed to the body of the blade members.

11. Axial fan according to claim 1, wherein one extremity of the flexible element is rigidly fixed to the hub of the fan, while at the other extremity of the flexible element is fixed to a clamping device which supports the root area of the blade members.

12. Axial fan according to claim 1, wherein the blade members, when stationary, are supported by a supporting element which is fixed to the hub.

* * * * *